United States Patent [19]
Lee

[11] Patent Number: 5,623,211
[45] Date of Patent: Apr. 22, 1997

[54] DEVICE AND A METHOD FOR TESTING DISCONNECTION BY GROUPING BUS LINES OF A SEMICONDUCTOR DEVICE

[75] Inventor: Sihyoung Lee, Namyangju-kun, Rep. of Korea

[73] Assignee: Samsung Electronics Co., Ltd., Suwon, Rep. of Korea

[21] Appl. No.: 384,532

[22] Filed: Feb. 1, 1995

[30] Foreign Application Priority Data

Feb. 2, 1994 [KR] Rep. of Korea ......................... 94-1896

[51] Int. Cl.$^6$ ................................................. G01R 27/26
[52] U.S. Cl. ........................... 324/538; 341/153; 324/537
[58] Field of Search ..................................... 324/537, 538, 324/522, 770; 371/22.1–22.6, 29.5; 345/87; 341/153

[56] References Cited

U.S. PATENT DOCUMENTS

| | | | |
|---|---|---|---|
| 3,530,460 | 9/1970 | Sheffield | 341/153 |
| 3,560,958 | 2/1971 | Braymer | 341/153 |
| 3,566,393 | 2/1971 | Girault et al. | 341/153 |
| 4,791,358 | 12/1988 | Sauerwald | 324/73 R |
| 4,812,742 | 3/1989 | Abel | 324/538 |
| 5,177,668 | 1/1993 | Lederer et al. | 361/386 |
| 5,412,315 | 5/1995 | Tsuda | 371/22.6 |
| 5,414,715 | 5/1995 | Hamblin et al. | 371/22.6 |
| 5,481,471 | 1/1996 | Naglestad et al. | 371/22.6 |

FOREIGN PATENT DOCUMENTS

| | | | |
|---|---|---|---|
| 933670 | 5/1993 | Rep. of Korea | G02F 1/13 |
| 933672 | 5/1993 | Rep. of Korea | G02F 1/13 |
| 937162 | 7/1993 | Rep. of Korea | G01R 31/02 |

*Primary Examiner*—Maura K. Regan
*Attorney, Agent, or Firm*—Cushman Darby & Cushman, IP Group of Pillsbury Madison & Sutro LLP

[57] ABSTRACT

A device for testing for disconnection of bus lines of a semiconductor device includes switches having current ratios formed in a geometric series connected to ends of a group of n of the bus lines. At least one testing electrode is connected to the switches and at least one power electrode is connected to the group of n of the bus lines. A disconnection of one or more of the bus lines can be determined according to a current flowing through the testing electrode.

7 Claims, 2 Drawing Sheets

DEVICE AND A METHOD FOR TESTING DISCONNECTION BY GROUPING BUS LINES OF A SEMICONDUCTOR DEVICE

BACKGROUND OF THE INVENTION

1. Field of the Invention

The present invention relates to a device and a method for testing disconnection of bus lines of a semiconductor device. More particularly, it relates to a device and a method for testing disconnection by grouping bus lines of a semiconductor device to find disconnected bus lines by grouping by n units bus lines to which switching devices whose current ratios from a geometric series are connected and measuring a sum of the current flowing through the bus lines grouped by n units when testing disconnection of a semiconductor device having bus lines as dynamic random access memory (DRAM), static random access memory (SRAM), liquid crystal display panel and the like.

2. Description of the Prior Art

Tests of disconnection or short of bus lines are performed when manufacturing semiconductor devices having bus lines (or electrode lines) as DRAM, SRAM, liquid crystal display panel, and the like.

FIG. 3 is a circuit diagram showing a method for testing disconnection of bus lines of a semiconductor device according to a conventional art.

A liquid crystal panel 30 is shown in FIG. 3, and there are formed electrodes DPAD, GPAD for applying test voltage respectively on an upper area in a column and on a left side in a row, and electrodes D1 to Dj and G1 to Gi for detecting current respectively on a lower area in a column and on a right side in a row.

The test determining whether the bus lines of the liquid crystal panel 30 are disconnected or not is performed by applying test voltage to the electrodes DPAD and GPAD on the upper area and the left side of the liquid crystal display panel 30, and testing whether the current is detected or not from the electrodes G1 to Gi and D1 to Dj on the lower area and the right side.

However, according to the conventional art, since each bus line of the semiconductor should have one testing electrode although the number of bus lines increases, spaces between the bus lines narrow, and whereby the bus lines have high density, the testing time increases and it becomes difficult to test minutely. Such a problem is more serious in a liquid crystal display panel that has a plurality of bus lines.

Korean Patent Publication Nos. 93-3670, 93-3672, and 93-7162 provide respectively a device for testing an indium tin oxide (ITO) electrode of a flat panel device, a method and a device for testing disconnection-short of a transparent electrode of a liquid crystal display device, and a device and a method for testing a transparent electrode of a flat panel device.

According to the above techniques, a micro processor determines whether bus lines are disconnected (or shorted) or not by current level of the bus lines (or electrode lines) of the semiconductor to which a voltage is applied. The current level is detected automatically by a switching method.

Although the current level is detected automatically by a switching method, a detection of the current level should be made one by one from each bus line. Such inconvenience and prolongation of testing time are still remaining unsolved.

SUMMARY OF THE INVENTION

It is an object of the present invention to provide a device and a method for testing disconnection by grouping bus lines of a semiconductor device providing bus lines having field effect transistors (FET) of n units whose current ratios form a geometric series, grouping the bus lines by n units, and measuring the sum of the current ratios by block unit, to find the bus lines disconnected in the corresponding block, and reduce the number of testing electrodes and testing time.

It is another object of the present invention to provide a device and a method for testing disconnection by grouping bus lines of the semiconductor device setting spaces between the testing electrodes without regards to spaces between the bus lines of the semiconductor device, thereby standardizing the testing method.

To achieve the objects, the present invention proposes a device for testing disconnection by grouping bus lines of a semiconductor device comprising:

switching devices connected to one end of each bus line of the semiconductor device, testing electrodes to which the above switching devices are connected, grouping by n units, and electrodes for applying electric power to which the other end of each bus line is connected to electrodes for applying electric power with grouping by n unit, the n switching device whose current ratios are formed in a geometric series being provided, and the current flowing through testing electrodes via n bus lines being predetermined when the voltage is applied to electrodes for applying an electric power.

As the other aspect of the present invention provides a method for testing disconnection by grouping bus lines of a semiconductor device comprising the steps of:

applying a voltage to an electrode;

determining a sum of current flowing through n bus lines and n switching devices whose current ratios are formed in a geometric series by the above electric power; and said current being the sum of each current value flowing through n bus lines, and distinguishing each of n bus lines by the current ratios forming a geometric series, to be determined if n bus lines are disconnected or not.

BRIEF DESCRIPTION OF THE DRAWINGS

Further advantages and other objects of the present invention will be apparent in the following detailed description in connection with the accompanying drawings, in which.

DETAILED DESCRIPTION OF THE PREFERRED EMBODIMENT

Figure 1:
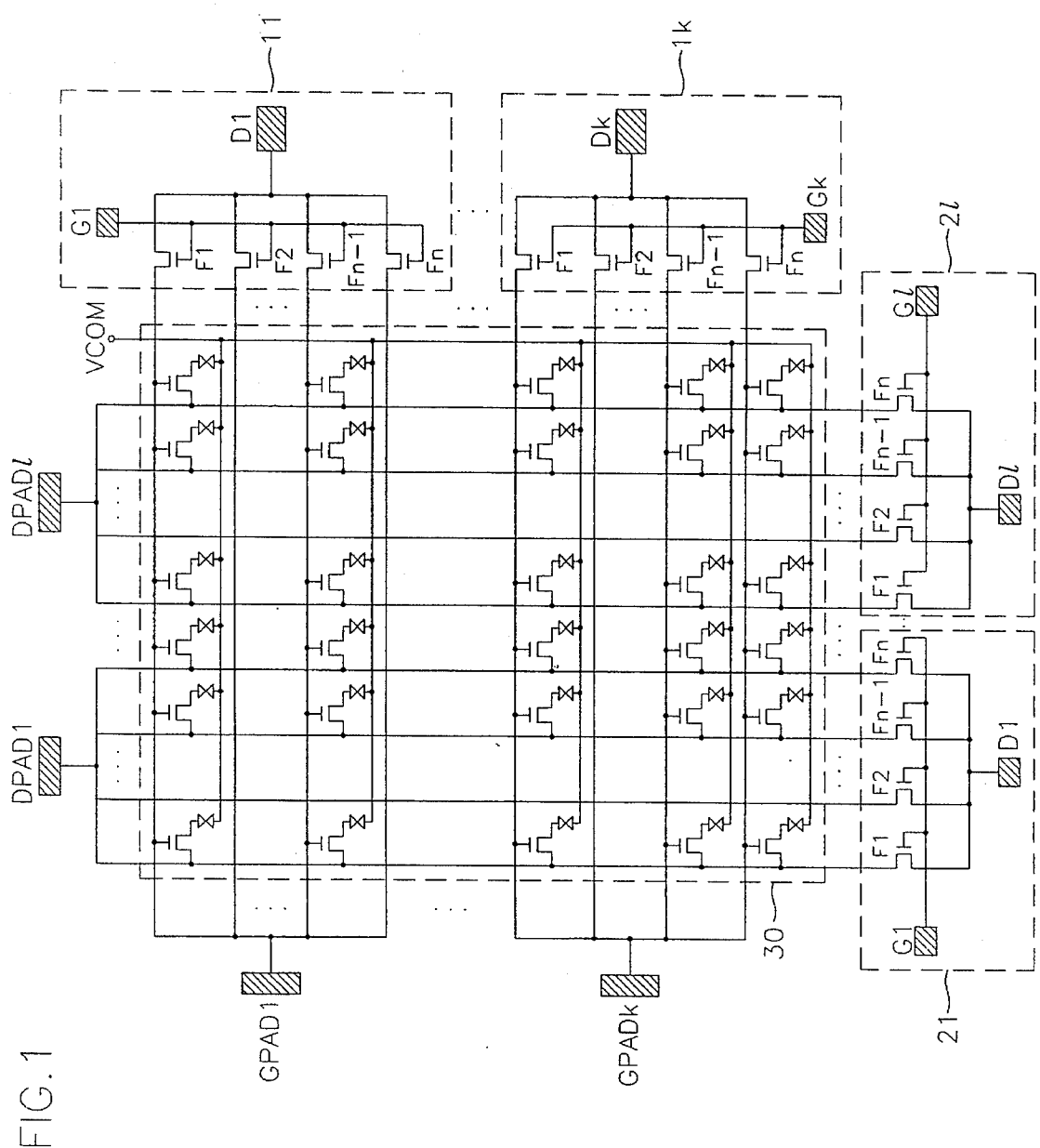
FIG. 1 is a detailed circuit diagram of a device for testing disconnection by grouping bus lines of a semiconductor device in accordance with a preferred embodiment of the present invention.
Figure 2:
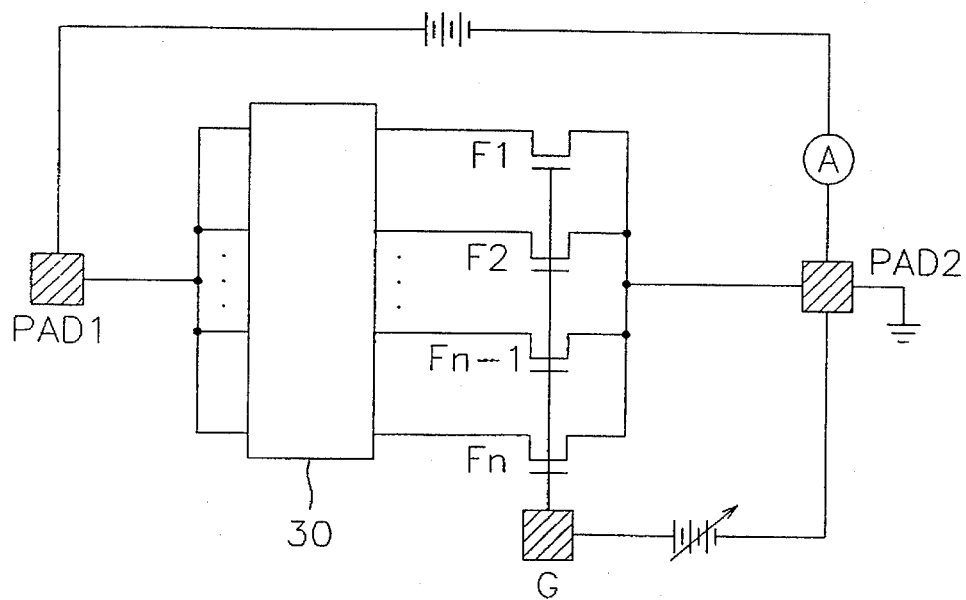
FIG. 2 is a detailed circuit diagram showing an example of applying a device for testing disconnection by grouping bus lines of a semiconductor device in accordance with the preferred embodiment of the present invention.
Figure 3:
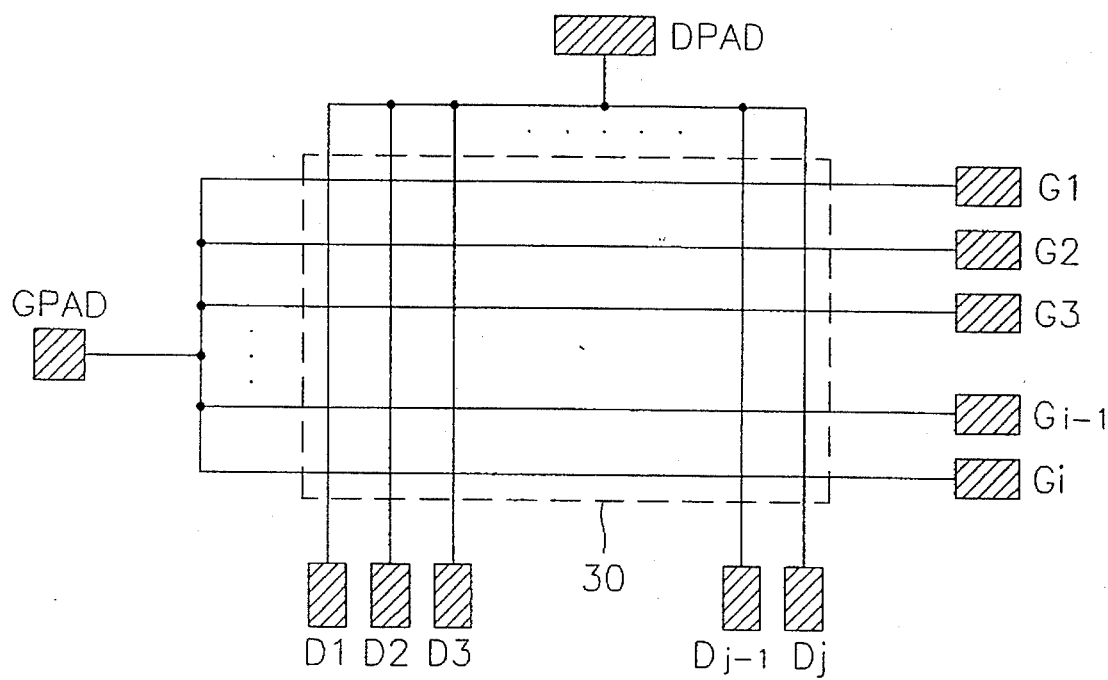
FIG. 3 is a circuit diagram showing a method for testing disconnection of bus lines of a semiconductor device in accordance with the conventional art.

FIG. 1 is a detailed circuit diagram of a device for testing disconnection by grouping bus lines of a semiconductor device in accordance with a preferred embodiment of the present invention;

FIG. 2 is a detailed circuit diagram showing an example of applying a device for testing disconnection by grouping bus lines of a semiconductor device in accordance with the preferred embodiment of the present invention.

As shown in FIG. 1, in the inventive device for testing disconnection by grouping bus lines of a semiconductor device, there are formed electrodes GPAD1 to GPADk and DPAD1 to DPAD1 for applying electric power respectively on an upper area and on a left side of a liquid crystal display panel 30, and field effect transistors (FET) respectively on a lower area and on a right side of the above liquid crystal display panel 30, the above FET is grouped by n units and testing electrodes D1 to Dk and D1 to D1 are connected to each block 11 to 1k and 21 to 21, and gate electrodes G1 to Gk and G1 to G1 are connected in common to n FETs within each block 11 to 1k and 21 to 21.

A liquid crystal panel 30 is used as a semiconductor device according to the preferred embodiment of the present invention. However, the technical scope of the present invention is not limited thereto. It can be applied to another semiconductor devices demanding a test of disconnection of bus lines as DRAM, SRAM, and the like.

The following description is about the operation of the device and the method for testing disconnection by grouping bus lines of the semiconductor device according to the preferred embodiment of the present invention.

The voltage is applied to the electrodes GPAD1 to GPADk and DPAD1 to DPAD1 for applying electric power formed respectively on the upper area and on the left side of the liquid crystal panel 30 and the circuit starts operating. The current flows through each of bus lines grouped by n units and each FET connected to each bus line by the voltage applied to the above electrodes GPAD1 to GPADk and DPAD1 to DAPD1 for applying the electric power.

At this time, the voltage is applied to the gate electrodes G1 to Gk and G1 to G1 within each block 11 to 1k and 21 to 21 and the n FETs is turned on, and therefore the current can be measured from the testing electrodes D1 to Dk and D1 to D1 within each block 11 to 1k and 21 to 21.

A variable voltmeter in FIG. 2 is to turn on the FET. The current flows through each bus line and each FET by the voltage applied to the electrode PAD1 and the current flowing through n bus lines can be determined by an ammeter A.

The FETs connected to each bus line in FIG. 1 are grouped by n units within a block 11 to 1k and 21 to 21 and the current ratios flowing through the n FETs F1 to Fn within each block 11 to 1k and 21 to 21 form a geometric series. The current ratios of the n FETs are set to have respectively different value of allowable current by regulating a ratio of width to length W/L of a channel region. The value of allowable current between a drain and a source of an optional mth FET is can be expressed as follows:

$i_m = a^m$ ('a' is a constant)

The current measured from the testing electrodes D1 to Dk and D1 to D1 within each block 11 to 1k and 21 to 21 is a sum of current flowing through the n bus lines and the n FETs, and the determined current can be expressed as the sum of the geometric series. In case that one of n lines within each block 11 to 1k and 21 to 21 is disconnected, the current measured from the testing electrodes D1 to Dk and D1 to D1 is detected excluding a current value of the line disconnected.

Accordingly, the disconnected line can be easily found if the bus lines disconnected are mapped according to current values determined from the testing electrodes D1 to Dk and D1 to D1. The current ratios of the n FETs are formed in a geometric series in order to easily find the disconnected bus lines by determining the current value from the testing electrodes D1 to Dk and D1 to D1.

For example, supposing n is 5 and a is 2, there are 5 FETs within one block, and current ratios of FETs are as follows:

$i1:i2:i3:i4:i5 = 1:2:4:8:16$

If a proportional constant is K and there are no disconnected lines within the corresponding block, the current value $i_{test}$ is measured as 31K from a corresponding testing electrode. The changes of the current values $i_{test}$ are as follows: in case that a first line is disconnected: 30K a second line is disconnected: 29K a third line is disconnected: 27K second and fourth lines are disconnected: 21K In any given cases, there can be determined by the current value determined from the testing electrode which bus line is disconnected.

Since the current values are differently determined from the corresponding block according to the disconnection of each bus line, the disconnected lines can be found by analyzing the current values. When putting the present invention to practical use, there can be used a measuring device to map disconnected bus lines according to current value measured from the testing electrodes.

In case that the present invention is applied to a VGA, TFT, or LCD panel having 480 gate lines and 1920 data lines, and the value of n is 5, that is, five bus lines are grouped within one block, the test can be made with electrodes decreased about 80 percent compared with the conventional art and 20 percent of the conventional testing time. Additionally, spaces between the testing electrodes are set without regards to spaces between the bus lines of the semiconductor device because the number of the testing electrodes is decreased, to standardize the testing method.

Although only a preferred embodiment and select modifications of the invention have been disclosed and described, it is apparent that other embodiments and modifications of the invention are possible within the scope of the appended claims.

What is claimed is:

1. A device for testing for disconnection of bus lines in a semiconductor device, comprising:

switching means connected to one end of a group of n of said bus lines of said semiconductor device, said switching means having current ratios formed in a geometric series;

at least one testing electrode connected to said switching means; and at least one power electrode connected to said group of n of said bus lines for applying electric power to said group of n of said bus line, such that a disconnection of one or more of said bus lines can be determined according to a current flowing through said testing electrode.

2. The device according to claim 1, wherein said semiconductor device comprises one of a liquid crystal display panel, a dynamic random access memory and a static random access memory.

3. The device according to claim 1, wherein said switching means is set to have current ratios formed in a geometric series by regulating ratios of width to lengths of channel regions of said switching means.

4. A method for testing for disconnection of bus lines in a semiconductor devices, comprising the steps of:

applying an electric power to said bus lines; and determining a sum of current flowing through a group n of said bus lines, wherein an amount of current flowing each of said n bus lines is varied in accordance with n switching means whose current ratios are formed in a geometric series; and distinguishing which of said n bus lines are disconnected in accordance with said sum.

5. A semiconductor device having a plurality of bus lines, comprising:

at least one electrode connected to at least one group of n of said bus lines for applying electric power to said at least one group of n of said bus lines;

switching means for decreasing an amount of testing time required while testing for disconnection of said bus lines, said switching means being connected to each bus line in said at least one group of n of said bus lines opposite said at least one electrode and having current ratios formed in a geometric series; and at least one testing electrode connected to output terminals of said switching means.

6. A device for testing for disconnection of bus lines of a semiconductor device, comprising:

switches having current ratios formed in a geometric series, each said switch being connected to a respective end of one of a group of n of said bus lines;

at least one testing electrode connected to said switches; and at least one power electrode connected to said group of n of said bus lines for applying electric power to said group of n of said bus lines;

wherein a disconnection of one or more of said bus lines can be determined according to a current flowing through said testing electrode.

7. The device of claim 6, wherein said switches are transistors, and said current ratios are formed by varying ratios of widths to lengths of channel regions of said transistors.

* * * * *